United States Patent
Klassen et al.

(10) Patent No.: US 8,416,477 B2
(45) Date of Patent: Apr. 9, 2013

(54) BLACK CALIBRATION SYSTEM AND METHODS FOR DOCUMENT SCANNERS

(75) Inventors: R. Victor Klassen, Webster, NY (US); Martin Edward Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1279 days.

(21) Appl. No.: 12/188,531

(22) Filed: Aug. 8, 2008

(65) Prior Publication Data
US 2010/0033776 A1  Feb. 11, 2010

(51) Int. Cl.
H04N 1/46 (2006.01)

(52) U.S. Cl.
USPC ........ 358/509; 250/559.1; 356/323; 356/445; 358/3.26; 358/406; 358/461; 358/464; 358/474; 358/516

(58) Field of Classification Search .......... 358/509, 358/3.26, 406, 461, 464, 474, 516; 250/559.1; 347/19; 356/319, 323, 411, 429, 445; 382/274, 382/312; 430/322
See application file for complete search history.

(56) References Cited

U.S. PATENT DOCUMENTS

| | | | | | |
|---|---|---|---|---|---|
| 4,546,045 | A | * | 10/1985 | Elias | 428/424.6 |
| 5,970,181 | A | * | 10/1999 | Ohtsu | 382/274 |
| 5,991,046 | A | * | 11/1999 | Shakespeare et al. | 356/429 |
| 6,053,972 | A | * | 4/2000 | Pitzer et al. | 106/456 |
| 6,130,749 | A | * | 10/2000 | Meeks et al. | 356/630 |
| 6,144,467 | A | * | 11/2000 | Tsai | 358/486 |

FOREIGN PATENT DOCUMENTS
JP  2006211141 A  *  8/2006

* cited by examiner

*Primary Examiner* — King Poon
*Assistant Examiner* — David S Cammack
(74) *Attorney, Agent, or Firm* — MH2 Technology Law Group LLP

(57) ABSTRACT

A method and systems for calibrating a document scanner are provided. The scanner calibration method includes providing a geometrically operative black absorption device having a structural geometry that is capable of receiving light and limiting propagation of the received light, where the black calibration target has a total light reflectance of less than one percent. The method further includes powering on a light source of a document scanner to provide light toward the black absorption device, where the light source generates a noise signal when providing the light. The method further includes detecting, by a sensor of the document scanner, light reflected from the black absorption device and generating calibration signals based on the reflected light and the noise signal.

19 Claims, 8 Drawing Sheets

BLACK CALIBRATION SYSTEM AND METHODS FOR DOCUMENT SCANNERS

DESCRIPTION OF THE INVENTION

1. Field of the Invention

The subject matter of this invention relates to scanner calibration. More particularly, the subject matter of this invention relates to black calibration targets for use in a document scanner during a black calibration process with the scanner's illumination component powered on.

2. Background

Regular calibration of a conventional document scanner is essential for maintaining the scanner at optimal efficiency. A typical calibration process involves calculating an offset value and a gain value by scanning black and white calibration targets, respectively. The offset and gain values are used to correct for offset errors and gain errors in a signal outputted by a sensing component of the scanner. Offset and gain errors may result from non-uniformities in the characteristics of illumination and sensing components of the scanner. For example, the sensing component may have inherent offset and gain characteristics and the sensing and illumination components may be affected by regularly occurring noise caused by the illumination component's power supply and driving circuits.

The purpose of scanner calibration is to compensate for the non-uniformities in the apparent sensitivities of the sensing component, such as a full-width-array scan bar, which contains multiple photo sensors typically arranged linearly across the width of the scan bar. An offset value associated with each of the photo sensors is established based on a black calibration, and a gain value associated with each of the photo sensors is established based on a white calibration and the associated offset value. The quality of the white calibration depends on the uniformity of the white calibration target. If the black calibration is performed with the illumination component powered on, the quality of the black calibration depends on the uniformity and darkness of the black calibration target.

Currently, a black calibration is typically performed with the illumination component powered off because obtaining a black calibration target having sufficient uniformity and darkness is difficult. This practice, however, fails to account and compensate for non-uniformity caused by regularly occurring noise and other systematic variation caused by the illumination component and its power supply and driving circuits, as well as other operational conditions such as the scanner's operational temperature, system noise, exposure balance, current draw, and the like. FIGS. 7A and 7B illustrate the effect of the regularly occurring noise caused by the illumination component and related circuits when not accounted for during the black calibration because the illumination component is powered off.

As shown in FIG. 7A, a lamp synchronization signal which causes spikes occurring once every 477 pixels appears in the sensing component's output because the lamp synchronization signal is not accounted and compensated for as the illumination component was powered off during the black calibration. As shown in FIG. 7B, in addition to the lamp synchronization signal, a high frequency noise caused by an interaction between the illumination component's power supply and the sensing component is also not accounted and compensated for because the illumination component was powered off during the black calibration. While improved electronic isolation could be used to reduce the effects of these interactions, this would be possible only at additional cost.

Therefore, there is a need to overcome these and other problems of the prior art to provide a method and systems for performing a black calibration of a document scanner, to account and compensate for non-uniformity and systematic variation caused by the document scanner's illumination component and its power supply and driving circuits, and to improve the overall accuracy of the output of the document scanner.

SUMMARY

According to various embodiments, the present teachings include a system for calibrating a document scanner. The scanner calibration system includes a geometrically operative black absorption device. The output calibration system further includes a document scanner having a light source and a sensor, wherein the light source provides light toward the black absorption device and the sensor detects light reflected from the black absorption device and generates calibration signals based on the reflected light.

According to various embodiments, the present teachings include a device for scanning documents. The document scanning device includes illumination means for providing light to illuminate a scan target in a document scanner and light absorption means for receiving the light and geometrically limiting propagation of the received light out of the light absorption means. The document scanning device further includes detection means for detecting the light reflected from the scan target, wherein the detection means generates calibration signals based on the light reflected from the light absorption means.

According to various embodiments, the present teachings include a method for calibrating a document scanner. The method includes providing a geometrically operative black absorption device and powering on a light source of a document scanner to provide light toward the black absorption device, wherein the black absorption device has a structural geometry capable of receiving the light and limiting propagation of the received light out of the black absorption device. The method further includes detecting, by a sensor of the document scanner, light reflected from the black absorption device, and generating calibration signals based on the reflected light.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
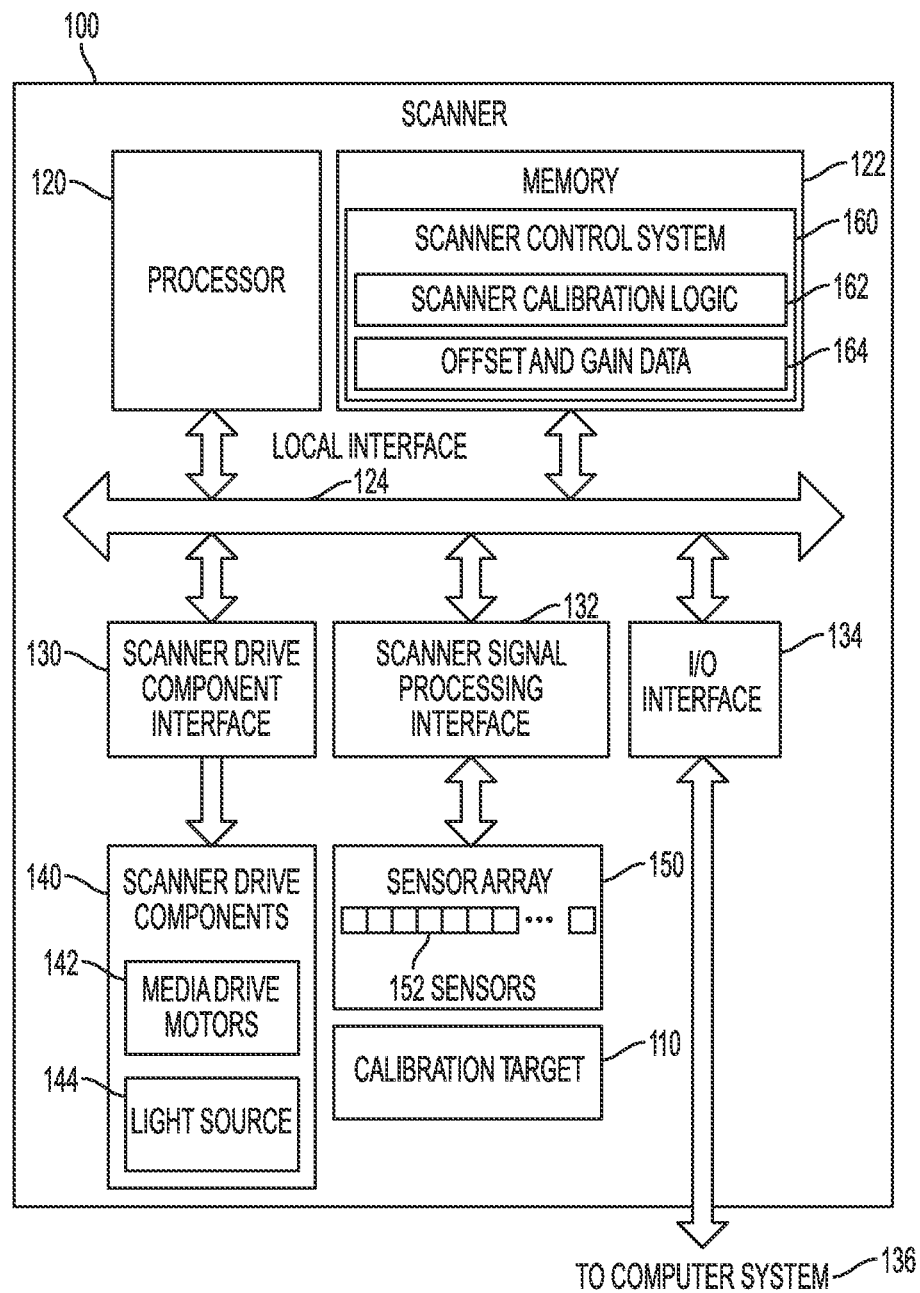
FIG. 1 is a schematic view illustrating a document scanner that incorporates an exemplary calibration target according to various embodiments of the invention.

Referring initially to FIG. 1, prior to describing the specific features of the exemplary embodiments, a schematic depiction of the various components of a document scanner incorporating an exemplary calibration target, various embodiments of which are described in more detail below, is provided. Although the exemplary calibration targets are particularly well adapted for use in a document scanner, it will be apparent from the following discussion that the present calibration targets are equally well suited for use in a wide variety of document processing devices as well as other systems that include the use of a document scanner. In particular, it should be noted that the exemplary calibration targets of the various embodiments can also be used in the document scanning subsystems of a typical facsimile or printing apparatus because such subsystems can include the use of a document scanner.

FIG. 1 depicts an embodiment of a document scanner 100 having an exemplary calibration target 110 in accordance with the present teachings. Scanner 100 includes a processor circuit with a processor 120 and a memory 122, both of which are coupled to a local interface 124. Local interface 124 may be, for example, a data bus with an accompanying control bus as is generally known to one of ordinary skill in the art. Coupled to local interface 124 is a scanner drive component interface 130, a sensor signal processing interface 132, and an input/output (I/O) interface 134. Scanner 100 also includes scanner drive components 140 that are coupled to local interface 124 through scanner drive component interface 130.

Scanner drive components 140 may include, for example, media drive motors 142, a scanner light source 144, indicator lights, and other components that are employed in the general operation of scanner 100 as is generally known to one of ordinary skill in the art. Drive motors 142 are employed, for example, to shuttle a scan target such as a paper document or other tangible media along a media pathway in a Y scan direction (not shown). Light source 144 may include one or more lights that illuminate the scan target during the course of a scan operation. For example, light source 144 may include red, green, and/or blue light emitting diodes or a light pipe that generate light distributed across the scan target with a line of light or a linear zone of light, as is generally known to one of ordinary skill in the art. The line of light extends in an X direction (not shown) relative to the scan target, perpendicular to the above-defined Y scan direction.

Scanner 100 also includes a sensor array 150 that is coupled to local interface 142 through sensor signal processing interface 132. Sensor array 150, without limitation thereto, may include a charge-coupled device that is configured as a linear array of discrete light-sensitive cells or photo sensors 152, each of which defines a picture element, or a pixel as is generally known to one of ordinary skill in the art. For example, sensor array 150 may be a full-width-array scan bar that includes sensors 152 linearly arranged along the width of sensor array 150 in a row parallel to the X direction to enable the scanning of lines in a scan target as it progresses through scanner 100.

Sensor signal processing interface 132 includes sensor signal processing circuitry that processes a number of signals produced by sensors 152 in sensor array 150 during the course of a scanning operation. I/O interface 134 provides the scanner information obtained from a scan operation to a computer system 136 or other devices. In addition, I/O interface 134 facilitates communication with computer system 136 during the normal operation of scanner 100 as is generally known to one of ordinary skill in the art.

Scanner 100 includes various components that are stored in memory 122 and executable by processor 120 for performing the functionality of scanner 100. In particular, stored in memory 122 is a scanner control system 160. Scanner control system 160 includes scanner calibration logic 162 and offset and gain data 164. Scanner control system 160 is executed by processor 122 to control the general operation of scanner 100. In particular, scanner control system 160 controls the activation of drive motors 142, light source 144, and other aspects of scanner 100. According to various embodiments, scanner calibration logic 162 is executed by processor 120 to calibrate scanner 100.

Next a brief overview of the operation of scanner 100 is provided. Assuming that a user wishes to scan a scan target (e.g., paper document or other tangible media) to create a digital copy, the scan target is placed into a receiving slot or surface of scanner 100 as is generally known to one of ordinary skill in the art. The user then initiates the scan in a conventional manner by manipulating an input device. Next, scanner control system 160 controls the operation of scanner drive components 140 including drive motors 142, light source 144, and other components in synchronization with the scanning function of sensor array 150 to obtain a digital representation of the scan target. The digital representation is then provided to computer system 136 or other device via I/O interface 134.

The scanning of the scan target is accomplished by repeatedly scanning "lines" of pixels from the scan target. To scan a line of pixels from the scan target, light source 144 is illuminated for a predetermined exposure time, thereby illuminating the scan target. Each of sensors 152 absorbs the light generated by light source 144 and reflected from the scan target, and generates a sensor value therefrom. The sensor values are then read out of sensor array 150 and accessed by processor 120 via sensor signal processing interface 132.

In order to obtain a faithful digital reproduction of the scan target, according to various embodiments scanner 100 is calibrated for optimal operation. To calibrate scanner 100, scanner calibration logic 162 is executed by processor 120. Scanner calibration logic 162 may be executed before the scanning of each scan target or at user-defined times based upon a predefined user input. Alternatively, scanner calibration may be performed after a predefined amount of scanner usage. Regardless of when scanner calibration logic 162 is executed, the execution thereof ensures the optimal operation of scanner 100.

In various embodiments, when scanner calibration logic 162 is executed, scanner 100 causes light source 144 to illuminate calibration target 110. The light reflected from calibration target 110 is directed towards sensor array 150. Sensor array 150 converts the reflected light into electrical signals corresponding to calibration image data representing the image that has been scanned, which during a calibration process is that of calibration target 110. This image data is then fed to a calibration circuit within sensor signal processing interface 132 to generate offset and gain correction data, which may be stored in offset and gain data 164. Offset and gain data 164 may also include predetermined or pre-measured reflectance values of several portions of calibration target 110.

In various embodiments, the calibration circuit may calculate the offset and gain correction data by comparing the signal from each of the pixels of sensors 152 with the stored predetermined data value for calibration target 110. The offset and gain correction data obtained during calibration helps to generate the best image quality by "calibrating out" dust in the optical path, inherent offset and gain characteristics of sensor array 150, non-uniformity caused by regularly occurring noise and other systematic variation in light source 144 and its power supply and driving circuits, interaction between sensor array 150 and the power supply of light source 144, as well as other operational conditions such as the scanner's operational temperature, system noise, exposure balance, current draw, and the like.

Figure 2A:
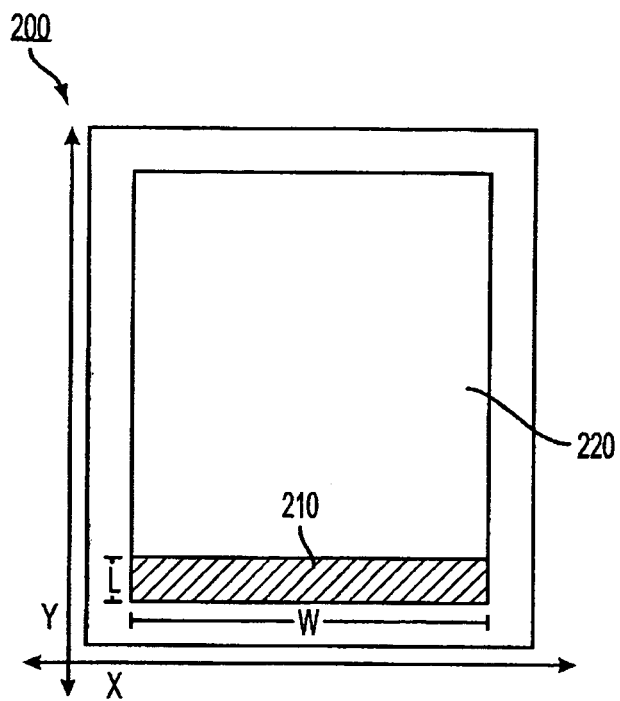
FIGS. 2A and 2B depict top views of an exemplary calibration target disposed in various locations of a document scanner according to various embodiments of the invention.
Figure 2B:
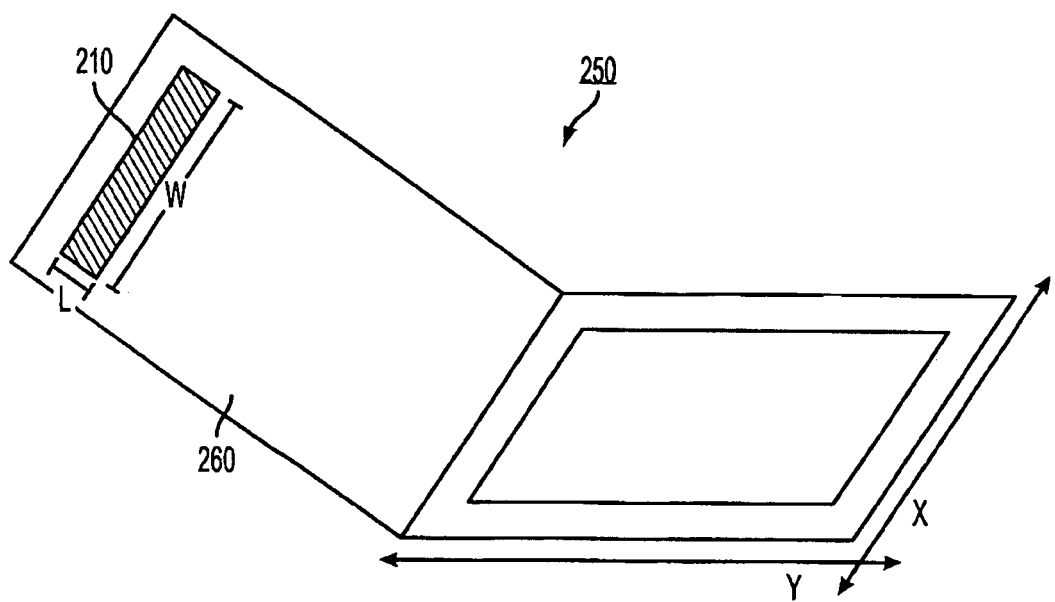

FIG. 2A is a top view of an exemplary calibration target 210 disposed on a surface of a platen 220 of a scanner 200 according to various embodiments. FIG. 2B is a perspective view of calibration target 210 disposed on an inside cover 260 of a scanner 250 according to various embodiments. Many variations in the types and properties of calibration target 210 are possible according to the present teachings. In various embodiments, calibration target 210 may be adhered, affixed, fastened, or otherwise coupled to the surface of platen 220 as shown in FIG. 2A, on inside cover 260 of scanner 250 as shown in FIG. 2B, or other suitable locations of the scanner. Calibration target 210 may have a width W, which extends in the X direction, of approximately equal to or slightly greater than a width of sensor array 150 to simultaneously accommodate sensors 152 across the full width of sensor array 150, which also extends in the X direction perpendicular to the Y scan direction. In further embodiments, if width W of calibration target 210 is less than the width of sensor array 150, calibration target 210 may be coupled to a movable carriage (not shown) capable of moving calibration target 210 in the X direction across the full width of sensor array 150 during calibration, to increase an effective width of calibration target 210 to at least the width of sensor array 150.

Figure 3A:
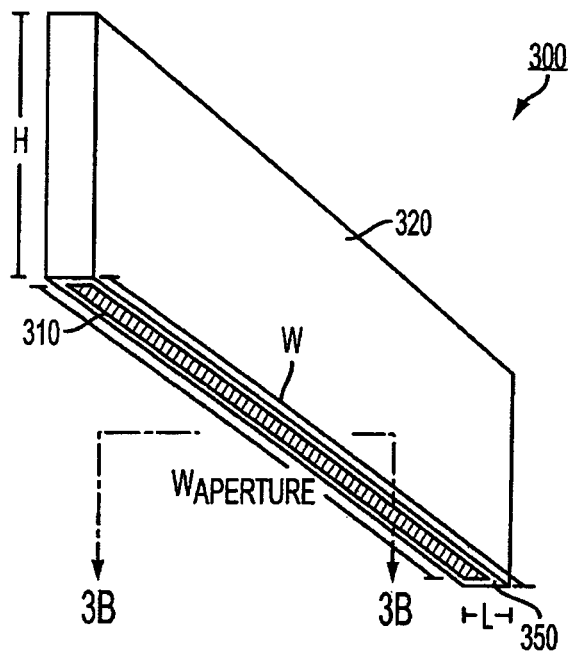
FIG. 3A depicts a bottom perspective view of an exemplary black calibration target according to various embodiments of the invention.
Figure 3B:
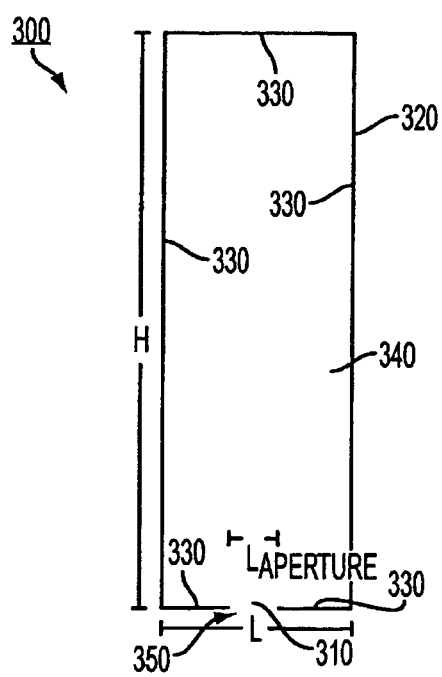
FIG. 3B depicts a partial cross sectional view of the exemplary black calibration target of FIG. 3A according to various embodiments of the invention.
Figure 4A:
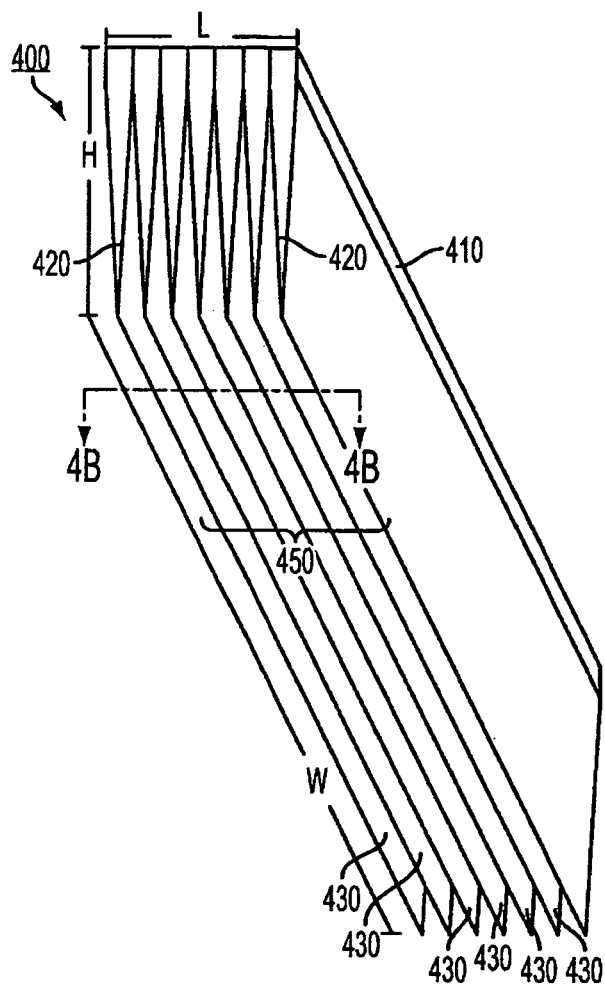
FIG. 4A depicts a bottom perspective view of an exemplary black calibration target according to various embodiments of the invention.
Figure 4B:
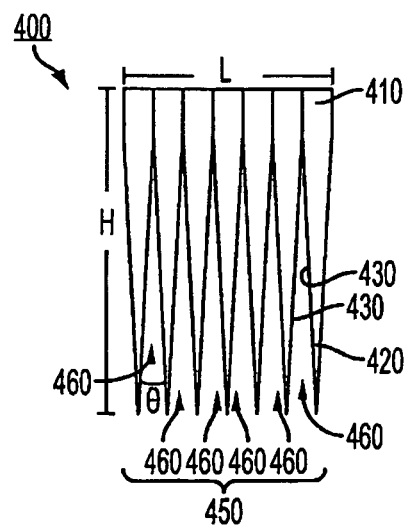
FIG. 4B depicts a partial cross sectional view of the exemplary black calibration target of FIG. 4A according to various embodiments of the invention.

Various embodiments of calibration target 210 include a geometrically operative black calibration target having a structural geometry that results in a total light reflectance of less than one percent. For example, according to a certain embodiment, calibration target 210 includes an optically opaque enclosure having an aperture as shown in FIGS. 3A and 3B and described in greater detail below. According to another embodiment, calibration target 210 includes a light trap formed from a collection of blades as shown in FIGS. 4A and 4B and described in greater detail below. According to yet another embodiment, calibration target 210 includes an array of nanotubes disposed on a calibration strip made of paper, plastic sheet, or other sheet-like material as shown in FIGS. 5A and 5B and described in greater detail below.

Figure 5A:
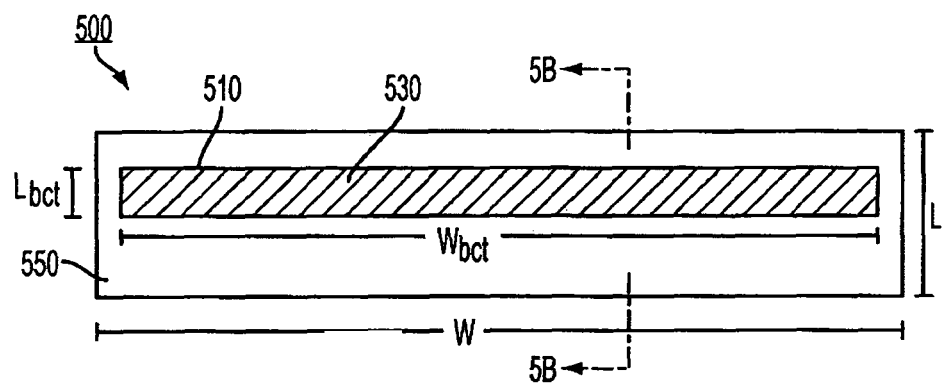
FIG. 5A depicts a top perspective view of an exemplary calibration target according to various embodiments of the invention.
Figure 5B:
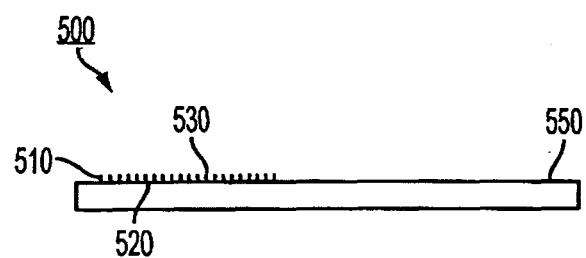
FIG. 5B depicts a partial cross sectional view of the exemplary calibration target of FIG. 5A according to various embodiments of the invention.

The term "black calibration target," which may be used interchangeably with "black absorption device," is used to refer to a region of space that the scanner's sensor (e.g., sensor array 150) points at during the calibration process, whether the black calibration region is an empty space formed by an aperture with a black cavity behind it (e.g., an optically opaque enclosure 300 as shown in FIGS. 3A and 3B), a region of space in front of openings into a black cavity formed by a collection of sharp blades (e.g., a light trap 400 as shown in FIGS. 4A and 4B), or part of a physical strip (e.g., a calibration strip 500 as shown in FIGS. 5A and 5B). Conceptually, the black calibration region has a width and height, but no depth. What makes the black calibration region black is what lies behind it.

FIG. 3A is a bottom perspective view of an exemplary embodiment of a black calibration target in accordance with the present teachings. FIG. 3B is a partial cross sectional view of the exemplary embodiment of the black calibration target in accordance with the present teachings. According to various embodiments, the black calibration target may be an optically opaque enclosure 300 made of plastic, metal, or other optically opaque material. Enclosure 300 may be adhered, affixed, fastened, or otherwise coupled to a top surface of the platen, a bottom surface of the platen, an inside surface of the scanner's cover, or other suitable locations of the scanner.

According to various embodiments, enclosure 300 has an outer surface 320 and an inner surface 330, and enclosure 300 defines a black cavity 340 that opens through an aperture 310 formed at a base 350. In various embodiments, aperture 310 functions as the exemplary black calibration target. Enclosure 300 may form a hollow structure, such as, for example, a shaped tube (e.g., a rectangular tube, a triangular tube, a curved tube, and the like) having a geometry that minimizes a total light reflectance for light that enters black cavity 340 through aperture 310. Although enclosure 300 is depicted as a rectangular tube, one of ordinary skill in the art will understand that this configuration is exemplary and that other configurations are contemplated.

The dimensions of enclosure 300 may vary depending on a desired geometry of enclosure 300 and dimensions of the scanner and components thereof. For example, in various embodiments, enclosure 300 may have a height H greater or substantially greater than a length L at base 350 to maximize the number of times an incident ray of light that enters black cavity 340 strikes inner surface 330 before the ray of light can escape black cavity 340 through aperture 310. For another example, according to various embodiments, enclosure 300 may have a sufficient width W, which extends in the X direction, at base 350 so that aperture 310 may be sufficiently wide to simultaneously accommodate sensors 152 across the full width of sensor array 150. In further embodiments, if width $w_{aperture}$ of aperture 310, which may also extend in the X direction, is less than the full width of sensor array 150, enclosure 300 may be coupled to a movable carriage (not shown) capable of moving aperture 310 in the X direction across the full width of sensor array 150 during calibration, to increase an effective width of aperture 310 to at least the width of sensor array 150. Aperture 310 may have a length $l_{aperture}$ that is substantially less than its width $w_{aperture}$ but sufficient to accommodate the pixels of sensors 152 (e.g., 50 microns, 100 microns, 1 mm, and the like).

In various embodiments, inner surface 330 may include an optically absorbent material (e.g., anti-reflectance film or paint, felt, carbon black, nanotube array, and the like) and/or finish (e.g., a baffle, a matte or flocked surface, and the like) that facilitate absorption of light, and thus minimizing the total light reflectance of black cavity 340 through aperture 310. Enclosure 300 according to various embodiments achieves a total light reflectance of less than one percent for light that enters into black cavity 340 through aperture 310 because of the geometry and/or optically absorbent material of inner surface 330. An incident ray of light that enters through aperture 310 into black cavity 340 strikes inner surface 330 and is substantially absorbed by inner surface 330, and substantially all reflected light is absorbed upon further reflections.

FIG. 4A is a bottom perspective view of an exemplary embodiment of a black calibration target in accordance with the present teachings. FIG. 4B is a partial cross sectional view of the exemplary embodiment of the black calibration target in accordance with the present teachings. According to various embodiments, the black calibration target may be a light trap 400 formed by fastening, joining, or otherwise coupling together, in a substantially parallel configuration, a collection of similarly dimensioned blades made of metal (e.g., steel, high carbon steel, black anodized metal, and the like) or other optically opaque material capable of maintaining an edge. Although exemplary light trap 400 is depicted to include seven parallel blades, one of ordinary skill in the art will understand that this configuration is exemplary and that other configurations are contemplated. Light trap 400 may be adhered, affixed, fastened, or otherwise coupled to a top surface of the platen, a bottom surface of the platen, an inside surface of the scanner's cover, or other suitable locations of the scanner.

According to various embodiments, the blades of light trap 400 each has a body 410, an edge 420, and blade surfaces 430 along edge 420, and the blades are each fastened, joined, or otherwise coupled to one or more adjacent blades at body 410 to form light trap 400 having a base 450. In various embodiments, light trap 400 forms a black cavity 460 between blade surfaces 430 of adjacent blades of light trap 400, where black cavity 460 functions as the exemplary black calibration target. The dimensions of the blades may vary depending on a desired geometry of light trap 400 for minimizing a total light reflectance for light that enters black cavity 460 through openings formed at base 450. For example, in various embodiments, each of the blades may have a height H greater or substantially greater than its thickness to form an acute angle $\theta$ between adjacent blades, and thus maximizing the number of times an incident ray of light that enters black cavity 460 strikes blade surfaces 430 before the ray of light can escape.

The dimensions of light trap 400 may vary depending on a desired geometry of light trap 400 and dimensions of the scanner and components thereof. For example, according to various embodiments, light trap 400 may have a sufficient width W, which extends in the X direction, so that black cavity 460 may be sufficiently wide to simultaneously accommodate sensors 152 across the full width of sensor array 150. In further embodiments, if width W of black cavity 430 is less than the full width of sensor array 150, light trap 400 may be coupled to a movable carriage (not shown) capable of moving black cavity 430 in the X direction across the full width of sensor array 150 during calibration, to increase an effective width of black cavity 430 to at least the width of sensor array 150. Light trap 400 may have a length L that is substantially less than its width W but sufficient to accommodate the pixels of sensors 152.

In various embodiments, blade surfaces 430 may include an optically absorbent material (e.g., anti-reflectance film or paint, carbon black, nanotube array, and the like) and/or finish (e.g., a baffle, a matte or flocked surface, and the like) that facilitate absorption of light, and thus minimizing the total light reflectance for light that enters black cavity 460. According to various embodiments, a desired light reflectance of blade surfaces 430 may be determined based on angle $\theta$ between the adjacent blades. For example, if angle $\theta$ is highly acute (e.g., less than 5°), then a light reflectance of blade surfaces 430 may be relatively high without adversely affecting the total light reflectance of black cavity 460. Light trap 400 according to various embodiments achieves a total light reflectance of less than one percent for light that enters black cavity 460 through the openings at base 450 because of the geometry of light trap 400 and/or optically absorbent material of blade surfaces 430. An incident ray of light that enters black cavity 460 strikes blade surfaces 430 and is partially absorbed by blade surfaces 430, and substantially all reflected light is absorbed upon further reflections.

FIG. 5A is a top view of an exemplary embodiment of a calibration target in accordance with the present teachings. FIG. 5B is a partial cross sectional view of the exemplary calibration target in accordance with the present teachings. As used herein, the term "nanotubes" refers to single-walled nanotubes (SWNT), multi-walled nanotubes (MWNT), horns, spirals, as well as rods, wires, and/or fibers formed from various conductive materials. Nanotubes may be formed of one or more elements from Groups IV, V, VI, VII, VIII, IB, IIB, IVA, and VA, including metals and alloys, such as, mixtures of these elements. In various embodiments, nanotubes may be formed of carbon. As used herein, all notation for element groupings refer to the CAS (Chemical Abstract System) notation system. The nanotubes can have any regular or irregular cross-sectional shape including, for example, round, oval, elliptical, rectangular, square, and the like. By controlling various parameters (e.g., composition, shape, width/diameter, length, alignment, orientation, chirality, and the like), the electrical, mechanical, and thermal properties of the nanotubes can be controlled.

As used herein, the term "nanotube array", which may be used interchangeably with "array of nanotubes" or "nanostructure" in the present disclosure, refers to a planar arrangement of nanotubes. The nanotube array may be fabricated and deposited by a number of methods including, but not limited to, vapor deposition, vacuum metallization, electro-plating, and electroless plating. However, it will be understood by one of ordinary skill in the art that other fabrication methods can also be used.

In accordance with various embodiments, the calibration target can be a calibration strip 500 made of paper, plastic sheet, or other sheet-like material. Calibration strip 500 may be adhered, affixed, fastened, or otherwise coupled to a top surface of the platen, a bottom surface of the platen, an inside surface of cover of the scanner, or other suitable locations of the scanner. A nanotube array 510 may be disposed over a surface 550 or a portion of surface 550 of calibration strip 500 to form an exemplary black calibration target.

In various embodiments, the nanotubes in nanotube array 510 are vertically aligned and have a first end that forms a bottom surface 520 and a second end that forms a dark surface 530, which functions as the exemplary black calibration target. By controlling various parameters of the nanotubes (e.g., composition, shape, width/diameter, length, alignment, orientation, chirality, and the like) and various parameters of nanotube array 510 (e.g., surface randomness/corrugation, periodicity, density, thickness, and the like), a geometry of nanotube array 510 can be controlled to achieve a desired total light reflectance of dark surface 530. For example, a total light reflectance of dark surface 530 of less than one percent can be achieved by forming a low-density (e.g., 0.01-0.02 g/cm$^3$) array of vertically-aligned thin-walled carbon nanotubes having a width of about 8-11 nanometers and a length of about 10-800 microns, the nanotubes arranged such that nanotube array 510 has an average array spacing of (50±10) nm and dark surface 530 exhibits a randomly oriented surface structure with a surface corrugation of about 100-1000 nm. For more information on an extremely dark material made by a low-density nanotube array, see Zu-Po Yang et al., "Experimental Observation of an Extremely Dark Material Made By a Low-Density Nanotube Array," published February 2008 by Nano Letters, the entire contents of which are expressly incorporated herein by reference.

The dimensions of calibration strip 500 may vary depending on the dimensions of the scanner and components thereof. For example, according to various embodiments, calibration strip 500 may have a sufficient width W, which extends in the X direction, so that dark surface 530 may have a sufficient width $w_{bct}$, which may also extend in the X direction, to simultaneously accommodate sensors 152 across the full width of sensor array 150. In further embodiments, if width $w_{bct}$ of dark surface 530 is less than the full width of sensor array 150, calibration strip 500 may be coupled to a movable carriage (not shown) capable of moving dark surface 530 in the X direction across the full width of sensor array 150 during calibration, to increase an effective width of dark surface 530 to at least the width of sensor array 150. Dark surface 530 may have a length $l_{bct}$ that is substantially less than its width $w_{bct}$ but sufficient to accommodate the pixels of sensors 152.

According to various embodiments, a ray of light directed at the black calibration target is captured and/or extinguished by the geometric configuration of the black calibration strip or cavity. That is, rather than employing a simple matte black surface, the ray of light is directed to successively reflect within the black calibration target, and because the ray of light loses energy upon each reflection, the black calibration target essentially captures, extinguishes, and/or limits the propagation of the ray of light. In any of the above-described embodiments, the typical path that the ray of light travels includes many reflections before any remaining portion of the ray of light escapes the black calibration target. For example, if the ray of light is directed to reflect ten times within the black calibration target prior to escaping the black calibration target, then an absorption efficiency required for each reflection is only 50% in order for the black calibration target to absorb 99.9% of the ray of light. For another example, if the ray of light is directed to reflect on an average twenty times within the black calibration target prior to escaping, then the absorption efficiency need only be 30% (i.e., 70% of the light may be reflected on each reflection) in order for the black calibration target to absorb 99.9% of the ray of light. In certain embodiments, such as the collection of sharp blades shown as light trap 400 in FIGS. 4A and 4B, a ray of light that enters the black calibration target may be directed to reflect many more times than twenty on average prior to any remaining portion escaping the black calibration target. Thus, various embodiments of the present teachings employ a geometrically operative black absorption device behind the black calibration target, relative to the sensing component, to achieve an extremely low total light reflectance.

Figure 6A:
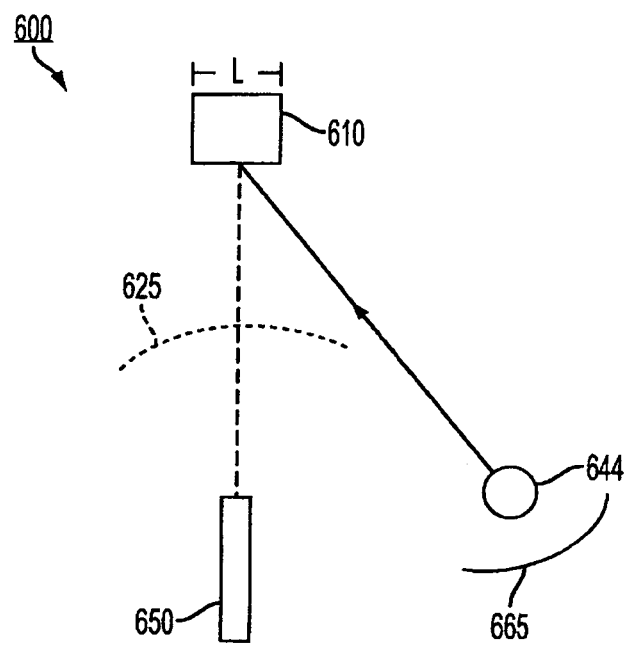
FIG. 6A depicts a partial cross sectional view of a document scanner that incorporates an exemplary calibration target according to various embodiments of the invention.

Operation of an exemplary black calibration process for a scanner 600 in accordance with the present teachings is shown in FIG. 6A. According to various embodiments, a calibration target 610 (e.g., enclosure 300 as shown in FIG. 3, light trap 400 as shown in FIG. 4, or calibration strip 500 as shown in FIG. 5) may be adhered, affixed, fastened, or otherwise coupled to a top surface of the platen, a bottom surface of the platen, an inside surface of cover of scanner 600, or other suitable locations of scanner 600. During the black calibration process, sensor array 650 is oriented toward calibration target 610 to detect light or lack of light reflected from calibration target 610. In various embodiments, calibration target 610 is positioned outside a focal area 625 of a sensor array 650. For example, as shown in FIG. 6A, calibration target 610 may be positioned at a distance from sensor array 650 beyond a focal area 625 of sensor array 650 so that calibration target 610 appears out of focus to sensor array 650. One of ordinary skill in the art will understand that this configuration is exemplary and that other configurations are contemplated.

In various embodiments, during the black calibration process, scanner 600 causes a light source 644 to illuminate calibration target 610 by generating a line of light or a linear zone of light toward calibration target 610, as is generally known to one of ordinary skill in the art. The line of light may extend in the X direction (not shown) perpendicular to a line extending along a length L of calibration target 610 parallel to the Y scan direction. Scanner 600 may include a mirror 665 to direct the light toward calibration target 610 and/or to optically shield sensor array 650 from direction illumination from light source 644.

According to various embodiments, the angle of incidence at which the light strikes calibration target 610 may be controlled by disposing light source 644 in a particular position relative to calibration target 610. For example, during the black calibration process, sensor array 650 may be disposed directly below calibration target 610, and thus light source 644 may be disposed at a position other than directly below calibration target 610, which results in the light striking calibration target 610 at a particular angle of incidence depending on the position of light source 644.

Sensor array 650 detects the light or lack of light reflected from calibration target 610 and generates electrical signals corresponding to calibration image data representing the image that has been scanned, which during the black calibration process is that of calibration target 610. The calibration image data may also include inherent offset and gain characteristics of sensor array 650, non-uniformity caused by regularly occurring noise and other systematic variation in light source 644 and its power supply and driving circuits, interaction between sensor array 650 and the power supply of light source 644, as well as other operational conditions such as the scanner's operational temperature, system noise, exposure balance, current draw, and the like. In various embodiments, the calibration image data may then used to produce offset and gain correction data by processing the signal from each of the pixels of sensor array 650. The calibration image data and/or offset and gain correction data may be stored by scanner 600 for future use and for evaluating whether or not scanner 600 is operating within normal parameters.

Figure 6B:
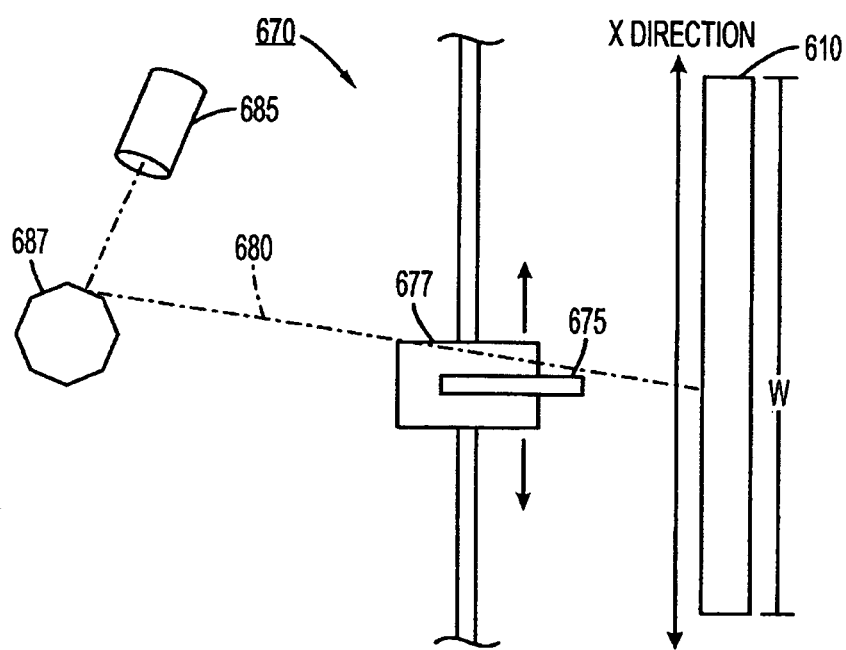
FIG. 6B depicts a partial cross sectional view of a flying spot scanner that incorporates an exemplary calibration target according to various embodiments of the invention.

In yet another embodiment as shown in FIG. 6B, calibration target 610 may be used in conjunction with a flying spot scanner 670, in which a sensing component 675, which may be mounted on a movable carriage 677, and an illuminant 680, which may be provided by an illumination component 685 and directed by a rotating polygonal mirror 687, move synchronously across a document page in the X direction when scanning a scan line extending along a width W of calibration target 610 perpendicular to the Y scan direction (not shown). This may be useful in a situation where sensing component 675 and/or illumination component 685 generate or is affected by a periodic signal that results from an interaction with drive motor circuitry of flying spot scanner 670 or for various other reasons. One of ordinary skill in the art will understand that this configuration is exemplary and that other configurations are contemplated.

Figure 7A:
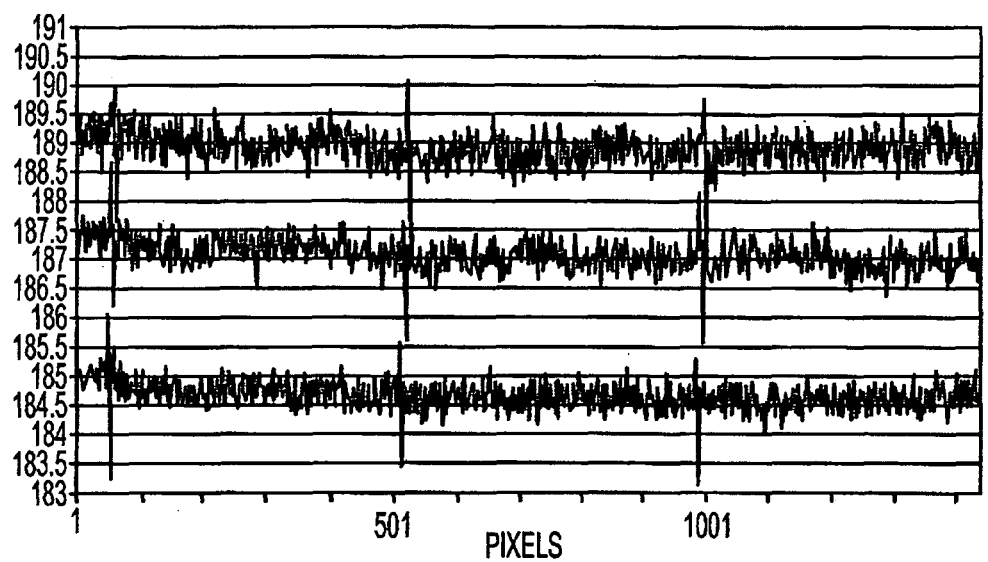
FIGS. 7A and 7B are graphs illustrating image data outputted by a scanner's sensing component after performing a black calibration process with the scanner's illumination component powered off.
Figure 7B:
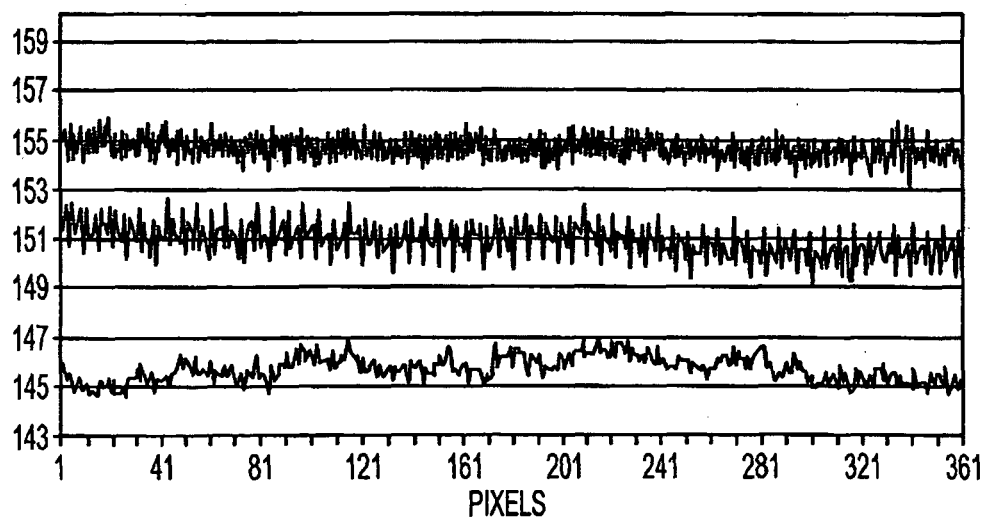
Figure 8A:
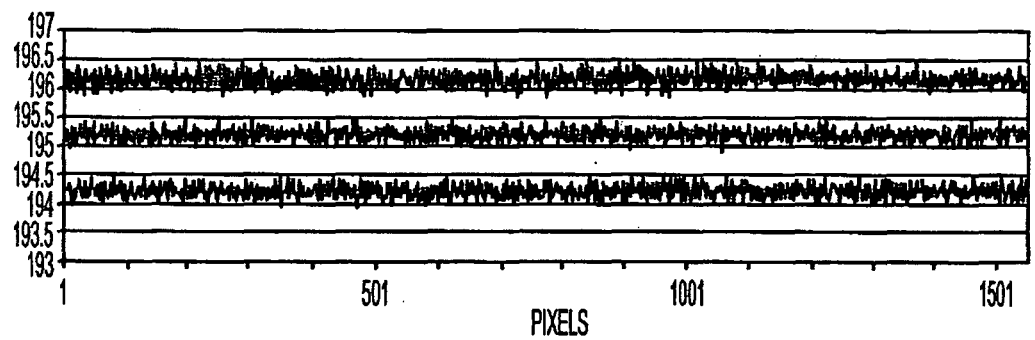
FIGS. 8A and 8B are graphs illustrating image data outputted by a scanner's sensing component after performing a black calibration process with the scanner's illumination component powered on according to various embodiments of the invention.
Figure 8B:
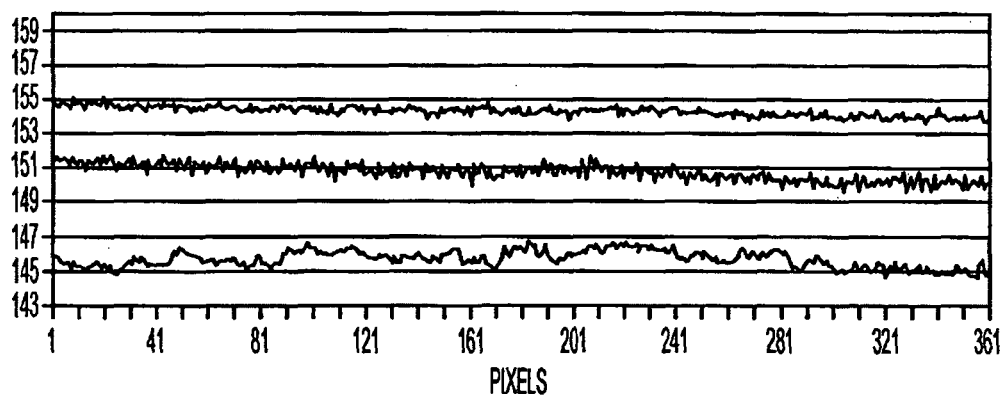

FIGS. 8A and 8B illustrate exemplary calibrated output of a scanner's sensor array (e.g., sensor array 150 of FIG. 1, sensor array 650 of FIG. 6A, sensing component 675 of FIG. 6B, or the like), after a black calibration process is performed with the scanner's light source (e.g., light source 144 of FIG. 1, light source 644 of FIG. 6A, illumination component 685 of FIG. 6B, or the like) powered on to account and compensate for regularly occurring noise and other systematic variation caused by the light source and related circuits. For example, as shown in FIG. 8A, a lamp synchronization signal which occurs once every 477 pixels (as shown in FIG. 7A) no longer appears in the sensor array's calibrated output because the lamp synchronization signal is accounted and compensated for by using offset and gain correction data generated from the black calibration process. For another example, as shown in FIG. 8B, a high frequency noise (as shown in FIG. 7B) caused by an interaction between the light source's power supply and the sensor array is also accounted and compensated for because the light source was powered on during the black calibration process.

Because the black calibration process is performed with the light source powered on using exemplary calibration targets disclosed herein, the offset and gain correction data obtained during the calibration process helps to improve the quality of images generated by the scanner. For example, the offset and gain correction data may be used to account and compensate for, or "calibrate out" dust in the optical path, inherent offset and gain characteristics of the sensor array, non-uniformity caused by regularly occurring noise and other systematic variation in the light source and its power supply and driving circuits, interaction between the sensor array and the light source's power supply, as well as other operational conditions such as the scanner's operational temperature, system noise, exposure balance, current draw, and the like.

One of ordinary skill in the art will recognize that the calibration target configurations disclosed herein are exemplary and that other configurations can be used that include a black calibration target which minimizes total light reflectance by virtue of its geometry. Further, it should be appreciated that, while disclosed systems and methods have been described in conjunction with exemplary document scanning devices, systems and methods according to this disclosure are not limited to such applications. Exemplary embodiments of systems and methods according to this disclosure can be advantageously applied to virtually any device to which black calibration is desired.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for calibrating a document scanner, comprising:
a geometrically operative black absorption device, comprising an optically opaque enclosure defining a black cavity and forming a hollow structure having a base, a width, a length, and a height extending away from the base, the height of the enclosure being greater than the length, and the enclosure further having an outer surface, an inner surface, and an aperture through the enclosure; and
a document scanner having a light source and a sensor, wherein:
the light source provides light toward the black cavity through the aperture;
the sensor detects light reflected from the black cavity through the aperture and generates calibration signals based on the reflected light.

2. The system of claim 1, wherein:
the black cavity is capable of receiving the light through the aperture and limiting propagation of the received light out of the black cavity; and
the black cavity has a total light reflectance of less than one percent through the aperture.

3. The system of claim 1, wherein:
the light source provides a line of light extending in a first direction;
the width of the enclosure extends in the first direction; and
the aperture is formed at the base of the enclosure, the aperture having a width extending in the first direction.

4. The system of claim 3, wherein:
the sensor includes an array of light sensors disposed in a line extending along a width of the sensor parallel to the first direction; and
the width of the aperture is equal to or greater than the width of the sensor.

5. The system of claim 3, wherein:
the sensor includes an array of light sensors disposed in a line extending along a width of the sensor parallel to the first direction; and
a length of the aperture is equal to or greater than a pixel size of one of the light sensors.

6. The system of claim 1, wherein
the black absorption device includes a light trap having a plurality of similarly dimensioned blades each having a body and two adjoining sides, where
a junction of the two adjoining sides of each of the blades forms an edge extending in a first direction; and the plurality of blades are coupled at the body and form a black cavity between adjacent blades of the plurality of blades.

7. The system of claim 6, wherein
the light trap forms at least one opening to the black cavity at a base of the light trap;
the black cavity has a width extending in the first direction;
the black cavity is capable of receiving the light through the at least one opening and limiting propagation of the received light out of the black cavity; and
the black cavity has a total light reflectance of less than one percent.

8. The system of claim 7, wherein
the sensor includes an array of light sensors disposed in a line extending along a width of the sensor parallel to the first direction; and
the width of the black cavity is equal to or greater than the width of the sensor.

9. The system of claim 1, wherein
the black absorption device includes a first surface and an array of vertically-aligned nanotubes each having a first end in contact with the first surface, wherein a second end of the array of nanotubes form a dark surface having a total light reflectance of less than one percent.

10. The system of claim 9, wherein
the nanotubes in the array of nanotubes are substantially perpendicular to the first surface; and
the array of nanotubes is capable of receiving the light at the dark surface and limiting propagation of the received light out of the dark surface.

11. The system of claim 1, wherein:
the sensor includes an array of light sensors disposed in a line extending along a width of the sensor;
a width of the black absorption device is less than the width of the sensor; and
the black absorption device is coupled to a movable carriage capable of moving the black absorption device across the width of the sensor.

12. The system of claim 1, wherein:
the light source generates a noise signal when providing the light; and
the sensor generates calibration signals based on the reflected light and the noise signal.

13. The system of claim 1, further comprising a signal processor for generating offset correction data based on the calibration signals.

14. A document scanning device, comprising:
illumination means for providing light to illuminate a scan target in a document scanner;
light absorption means for receiving the light and geometrically limiting propagation of the received light out of the light absorption means, wherein the light absorption means comprises a geometrically operative black absorption device comprising an optically opaque enclosure defining a black cavity and forming a hollow structure having a base, a width, a length, and a height extending away from the base, the height of the enclosure being greater than the length, and the enclosure further having an outer surface, an inner surface, and an aperture through the enclosure; and
detection means for detecting the light reflected from the scan target, wherein the detection means generates calibration signals based on the light reflected from the light absorption means through the aperture.

15. The document scanner of claim 14, wherein the light absorption means has a total light reflectance of less than one percent.

16. A method for calibrating a document scanner, the method comprising:
providing a geometrically operative black absorption device comprising an optically opaque enclosure defining a black cavity and forming a hollow structure having a base, a width, a length, and a height extending away from the base, the height of the enclosure being greater than the length, and the enclosure further having an outer surface, an inner surface, and an aperture through the enclosure;
powering on a light source of a document scanner to provide light toward the black cavity through the aperture, wherein the black absorption device has a structural geometry capable of receiving the light and limiting propagation of the received light out of the black absorption device;
detecting, by a sensor of the document scanner, light reflected from the black device cavity through the aperture; and
generating calibration signals based on the reflected light.

17. The method of claim 16, wherein the black absorption device has a total light reflectance of less than one percent.

18. The method of claim 16, further comprising generating the calibration signals based on the reflected light and a noise signal, wherein the light source generates the noise signal when providing the light.

19. A system for calibrating a document scanner, comprising:
a geometrically operative black absorption device;
a document scanner having a light source and a sensor, wherein:
the light source provides light toward the black absorption device;
the sensor detects light reflected from the black absorption device and generates calibration signals based on the reflected light; and
the sensor includes an array of light sensors disposed in a line extending along a width of the sensor;
a width of the black absorption device is less than the width of the sensor; and
the black absorption device is coupled to a movable carriage capable of moving the black absorption device across the width of the sensor.

* * * * *